United States Patent [19]

Bishop

[11] 4,317,551
[45] Mar. 2, 1982

[54] APPARATUS FOR SUPPORTING A CONTAINER FOR LIQUID WHILE DISPENSING

[76] Inventor: George F. L. Bishop, 23808 S. Highway 172, Ignacio, Colo. 81137

[21] Appl. No.: 164,407

[22] Filed: Jun. 30, 1980

[51] Int. Cl.³ .............................................. A47F 5/12
[52] U.S. Cl. ...................................... 248/141; 211/81
[58] Field of Search ............... 248/130, 137, 138, 141, 248/139, 133, 142; 211/77, 81, 78; D7/70

[56] References Cited

U.S. PATENT DOCUMENTS

| | | |
|---|---|---|
| 81,814 | 9/1868 | Nuellens . |
| 261,956 | 8/1882 | Rinker . |
| 370,607 | 9/1887 | Chandler ............................ 248/141 |
| 395,504 | 1/1889 | Nason . |
| 423,631 | 3/1890 | Reno ................................. 248/141 |
| 996,658 | 7/1911 | Minor ................................. 248/142 |
| 1,203,202 | 10/1916 | Kinsella . |
| 1,301,536 | 4/1919 | Bee ............................... 248/141 X |
| 1,455,974 | 5/1923 | Solon ............................. 248/134 X |
| 1,527,962 | 2/1925 | Lamb . |
| 1,755,745 | 4/1930 | Parr ..................................... 248/141 |
| 1,887,881 | 11/1932 | Blattner . |
| 2,060,170 | 11/1936 | Buck et al. . |
| 2,817,458 | 12/1957 | Amigone . |
| 3,868,047 | 2/1975 | Bersano . |

FOREIGN PATENT DOCUMENTS 400595 10/1933 United Kingdom ................. 211/81

*Primary Examiner*—J. Franklin Foss
*Attorney, Agent, or Firm*—Pollock, Vande Sande & Priddy

[57] ABSTRACT

An improved apparatus for supporting a bottle or similar container of liquid during dispensing is disclosed in which the bottle is supported on a platform or cradle (28) which is pivotably mounted on a fixed base (10). The cradle includes a resilient pad (34) on which the bottom of the bottle rests during use and an adjustable clamp (42-60) which can be set to accommodate bottles having upwardly extending necks of various heights and diameters.

15 Claims, 5 Drawing Figures

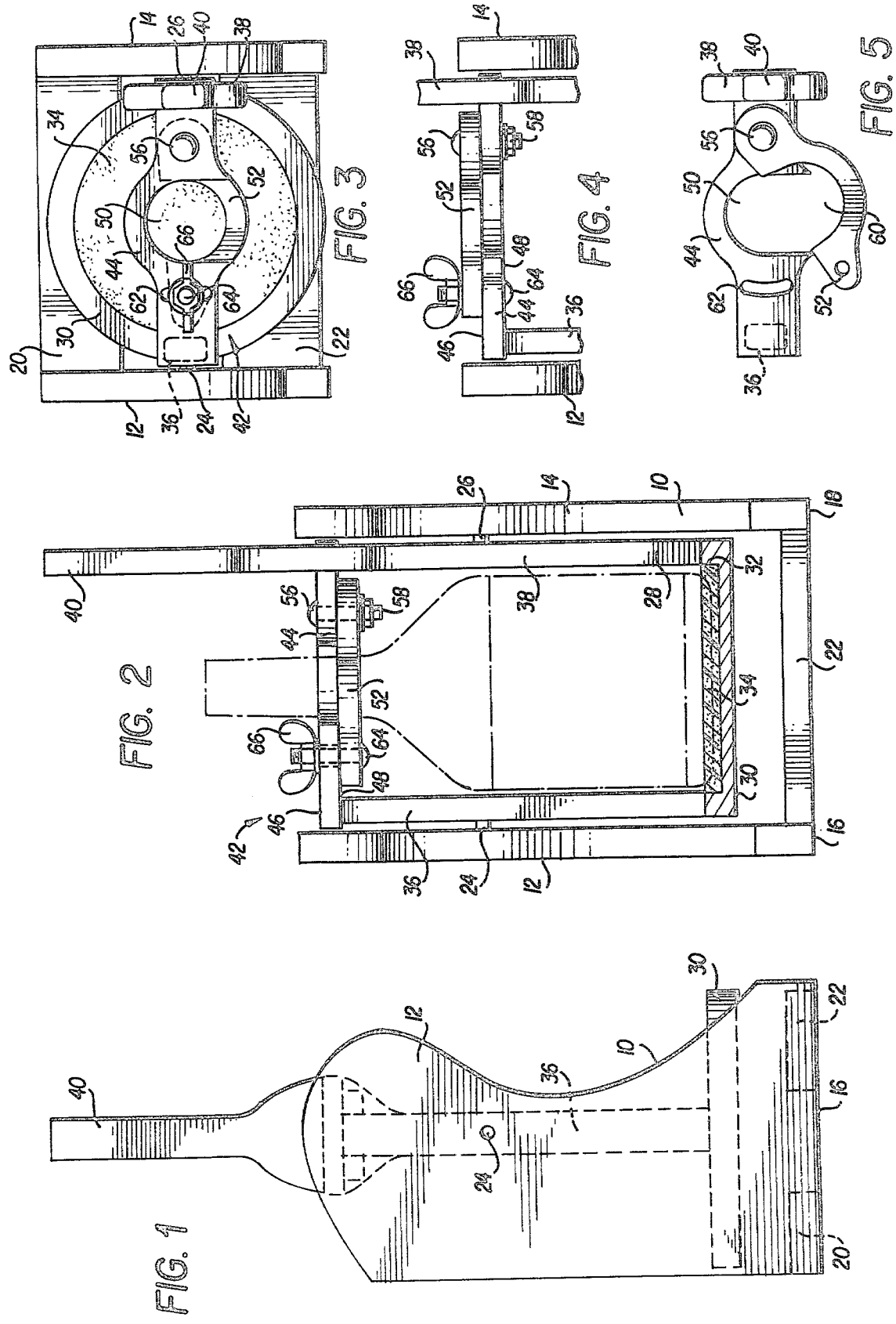

4,317,551

APPARATUS FOR SUPPORTING A CONTAINER FOR LIQUID WHILE DISPENSING

TECHNICAL FIELD

The present invention relates to devices for supporting bottles or containers of liquid while dispensing their contents. More particularly, the invention concerns such a device in which the bottle is supported in a pivotable cradle which permits tipping the bottle to a position in which its contents may be conveniently dispensed.

BACKGROUND ART

Pivotable supports have been used for many years to facilitate dispensing liquid from containers ranging in size, for example, from very large carboys of chemical reagents to rather small bottles of wine and distilled liquors. Often such devices have been designed to accommodate a single size of bottle or container which has naturally limited their usefulness when different size bottles are encountered. Where provision has been made for bottles of various sizes, insertion and removal of the bottle typically has been rather difficult due to the complexity of the device. A need has continued to exist for a device which is easily adjusted to accommodate bottles of different sizes, which facilitates quick insertion of a full bottle and removal of an empty one and which securely holds the bottle against accidental dropping during use. In recent years, this need has been especially acute in the restaurant and cocktail lounge business, where the use of half-gallon bottles, or more recently 1.75 liter bottles, has become a popular way to reduce the cost of liquor inventory but has presented problems to bartenders who must work with the heavy bottles.

DISCLOSURE OF THE INVENTION

The primary object of the present invention is to provide a simple apparatus for supporting a bottle or similar container during dispensing of its contents, the apparatus being adjustable to accept bottles of various sizes.

Another object of the invention is to provide such an apparatus which includes means for preventing sliding movement of the bottle on its support when the apparatus is pivoted to tilt the bottle for dispensing of its contents.

These objects of the invention are given only by way of example; thus, other desirable objectives and advantages inherently achieved by the disclosed structure may occur to those skilled in the art. Nonetheless, the scope of the invention is to be limited only by the appended claims.

In a preferred embodiment of the invention, an apparatus for supporting a bottle or similar container of the type having an upwardly extending neck portion includes a base element and a cradle or support platform pivotably mounted on the base element for rotation about a horizontal axis. Means are mounted on the platform for adjustably securing to it bottles or similar containers having rather wide bases that taper past shoulder portions to upwardly extending neck portions of various heights and diameters. The support platform may be provided with means for preventing sliding movement of the bottom of the bottle or container upon rotation of the platform, such as a pad of resilient foam material on which the bottom of the bottle rests during use of the apparatus. The resilient pad also serves to bias some bottles slightly upwardly into contact with the previously mentioned means for securing the bottle to the support platform.

In one embodiment, the means for adjustably securing the bottle to the platform comprises a pair of clamping jaws which are pivoted for rotation relative to each other about an axis, the jaws defining between them an adjustable opening through which the neck portions of bottles extend during use of the apparatus. Means such as a bolt and wing nut are provided for securing the jaws in position about the neck portion of a bottle. To accommodate bottles having neck portions of differing diameters, one of the jaws is provided with a slot spaced from the pivot point of the jaws, through which the previously mentioned fastener extends.

To permit adjustment of the apparatus to accommodate bottles having neck or shoulder portions of different heights, one of the clamping jaws is fixed to the support platform and is provided with flat upper and lower sides. The other jaw is configured to be selectively pivoted on either of the sides of the first so that the lowest height at which the bottle is clamped may be adjusted.

BRIEF DESCRIPTION OF THE DRAWINGS

FIG. 1 shows a side elevation view of an apparatus according to the present invention.

FIG. 2 shows a front elevation view of an apparatus according to the invention, including in phantom the outline of a liquid container of the general type for which the invention is suited.

FIG. 3 shows a plan view of an apparatus according to the invention.

FIG. 4 shows the alternate mode of assembling the clamping means comprised in the invention so that bottles are clamped at a higher location than would be the case for the configuration illustrated in FIG. 2.

FIG. 5 shows a plan view of the clamping means used in the invention.

BEST MODE FOR CARRYING OUT THE INVENTION

The following is a detailed description of the preferred embodiment of the invention, reference being made to the drawings in which like reference numerals identify like elements of structure in each of the several figures.

Referring to FIGS. 1 and 2, the apparatus according to the invention may be seen to comprise a base 10 having a pair of upwardly extending side members 12 and 14 which are joined at or near their lower edges 16 and 18 by suitable crosspieces 20 and 22. A pair of horizontally extending, juxtaposed pivots 24 and 26 extend from side portions 12, 14 to pivotably mount a support platform 28.

Platform 28 comprises a bottom support member 30 which may be formed of a disk of wood or other suitable material having a recess 32 in its upper surface within which is located a resilient, high friction polymeric foam pad 34. In use of the apparatus, as illustrated in FIG. 2, a bottle would rest on foam pad 34 and thereby be prevented from sliding on support 30. A pair of arms 36, 38 extend upwardly from support 30 and are secured to pivots 24, 26. One of the arms may be provided with an upward extension 40 which facilitates rotation of platform 28 when dispensing the contents of a bottle. Means 42 are provided on the support platform 28 for adjustably securing thereon bottles or similar containers having upwardly extending neck portions of various heights and diameters.

As shown in FIGS. 2 to 5, adjustable securing means 42 is secured to support platform 28 at or near the upper ends of arms 36, 38, preferably at a location above pivots 24, 26. Means 42 comprises a fixed jaw 44 which preferably extends between and is fixed to arms 36, 38 but also may be cantilevered from one arm or the other as desired. Jaw 44 preferably has flat upper and lower surfaces 46, 48 and includes a central U-shaped opening 50. A movable jaw 52 is pivoted to fixed jaw 44 by means such as a bolt 56 and nut 58 or the like and also includes a central, U-shaped opening 60. Spaced across U-shaped opening 60 from bolt 56 is an arcuate slot 62 through which a further bolt 64 extends into engagement with a wing nut 66 or similar fastener. As shown in FIGS. 2 and 4, movable jaw 52 may be mounted beneath or on top of fixed jaw 44 as necessary to accommodate bottles having neck portions of different heights. Similarly, movable jaw 52 may be pivoted by sliding bolt 64 through slot 62 to accommodate bottles having necks of different diameters. Except for pad 34, the fasteners 56, 58 and 64, 66 and pivots 24, 26, the entire apparatus preferably is made from wood, though other materials may be used.

In use, the bottle whose contents are to be dispensed is placed on pad 34 and movable jaw 52 is then pivoted to fixed jaw 44 in contact with either of surfaces 46, 48. In many cases, it is possible to locate movable jaw 52 so that with pad 34 slightly compressed, the shoulders of the bottle from which its neck portion extends are pushed into contact with the underside of one of jaws 44 and 52. This relatively tight fit, combined with the clamping effect of the jaws and the anti-skid properties of pad 34, tends to prevent movement of the bottle as it is rotated about pivots 24, 26 to a position convenient for dispensing.

In one actual embodiment, more than thirty different types of 1.75 liter bottles could be accommodated. Base 10 was approximately 13.25 inches high, 8.75 inches wide and 7.5 inches deep. Pivots 24, 26 were located 8.75 inches from the bottom of the base. Support 30 was 6.75 inches in diameter and pad 34 was 5.5 inches in diameter and 0.5 inches thick. Jaws 44, 52 were one half inch thick and U-shaped openings 50, 60 were 2 inches in diameter. Bolts 56 and 64 were located 0.5 inches outside the diametral edges of openings 50, 60. Surface 46 was 4.25 inches above pivots 24, 26.

Having described my invention in sufficient detail to enable those skilled in the art to make and use it, I claim:

1. An improved apparatus for supporting a bottle or similar container having an upwardly extending neck portion to facilitate dispensing the contents thereof, said apparatus comprising:
   a base element;
   a support platform pivotably mounted on said base element for rotation about a horizontal axis, said platform comprising means for preventing sliding movement of the bottom of a bottle or similar container upon rotation of said platform, said preventing means comprising a pad of resilient material on which the bottom of a bottle or similar container rests during use of said apparatus; and
   means mounted on said platform for adjustably securing thereon bottles or similar containers having upwardly extending neck portions of various heights and diameters, said securing means comprising a first clamping jaw fixed to said platform and provided with upper and lower sides; a second clamping jaw adapted to be selectively pivoted to said first clamping jaw on either of said sides, said first and second jaws defining an adjustable opening through which said neck portions extend during use of the apparatus, whereby said bottles and similar containers having necks of various heights and diameters may be accommodated; a slot extending through one jaw at a point spaced from the pivot between said jaws and a fastener extending from the other jaw through said slot.

2. An improved apparatus for supporting a bottle or similar container having an upwardly extending neck portion to facilitate dispensing the contents thereof, said apparatus comprising:
   a base element;
   a support platform pivotably mounted on said base element for rotation about a horizontal axis; and
   means mounted on said platform for adjustably securing thereon bottles or similar containers having upwardly extending neck portions of various heights and diameters, said securing means comprising a first clamping jaw fixed to said platform and provided with upper and lower sides; a second clamping jaw adapted to be selectively pivoted to said first clamping jaw on either of said sides, said first and second jaws defining an adjustable opening through which said neck portions extend during use of the apparatus, whereby said bottles and similar containers having necks of various heights and diameters may be accommodated; and means for securing said jaws in position about the neck portion of a bottle or similar container.

3. Apparatus according to claim 2, wherein said support platform comprises means for preventing sliding movement of the bottom of a bottle or similar container upon rotation of said support platform.

4. Apparatus according to claim 3, wherein said means for preventing sliding movement comprises a pad of resilient material on which the bottom of a bottle or similar container rests during use of said apparatus.

5. Apparatus according to claim 2, wherein said means for securing said jaws comprises a slot extending through one jaw at a point spaced from the pivot between said jaws and a fastener extending from the other jaw through said slot.

6. Apparatus according to claim 5, wherein said support platform comprises means for preventing sliding movement of the bottom of a bottle or similar container upon rotation of said support platform.

7. Apparatus according to claim 6, wherein said means for preventing sliding movement comprises a pad of resilient material on which the bottom of a bottle or similar container rests during use of said apparatus.

8. An improved apparatus for supporting a bottle or similar container having an upwardly extending neck portion to facilitate dispensing the contents thereof, said apparatus comprising:
   a base element;
   a support platform pivotably mounted on said base element for rotation about a horizontal axis;
   means mounted on said platform for adjustably securing thereon bottles or similar containers having upwardly extending neck portions of various heights and diameters, said securing means comprising a pair of clamping jaws pivoted for rotation relative to each other about an axis, said jaws defining an adjustable opening through which said neck portions extend during use of the apparatus; and means for securing said jaws in position about the neck portion of a bottle or similar container; and resilient means mounted on said platform for biasing bottles or similar containers upward into contact with at least one of said clamping jaws.

9. Apparatus according to claim 8, wherein said resilient means comprises a pad of resilient material on which the bottom of a bottle or similar container rests during use of said apparatus.

10. Apparatus according to claim 8, wherein the first of said clamping jaws is fixed to said platform and the second of said clamping jaws is pivoted to the first.

11. Apparatus according to claim 8, wherein said means for securing said jaws comprises a slot extending through one jaw at a point spaced from the pivot between said jaws and a fastener extending from the other jaw through said slot.

12. Apparatus according to claim 8, wherein the first one of said jaws is fixed to said platform, said first jaw having upper and lower sides, and the second one of said jaws is adapted to be selectively pivoted to the first on either of said sides, whereby bottles and similar containers having necks of different heights may be accommodated.

13. Apparatus according to claim 12, wherein said means for securing said jaws comprises a slot extending through one jaw at a point spaced from the pivot between said jaws and a fastener extending from the other jaw through said slot.

14. Apparatus according to claim 12, wherein said support platform comprises means for preventing sliding movement of the bottom of a bottle or similar container upon rotation of said support platform.

15. Apparatus according to claim 14, wherein said means for preventing sliding movement comprises a pad of resilient material on which the bottom of a bottle or similar container rests during use of said apparatus.

* * * * *